US010267969B2

(12) United States Patent
Kitamura et al.

(10) Patent No.: US 10,267,969 B2
(45) Date of Patent: Apr. 23, 2019

(54) OPTICAL DEVICE, OPTICAL SYSTEM, AND TICKET GATE

(71) Applicant: OMRON Corporation, Kyoto-shi, Kyoto (JP)

(72) Inventors: Norikazu Kitamura, Osaka (JP); Masayuki Shinohara, Nagaokakyo (JP); Yuji Hirose, Kyotanabe (JP); Yasuhiro Tanoue, Otsu (JP); Mitsuru Okuda, Kusatsu (JP); Kazuyuki Okada, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 93 days.

(21) Appl. No.: 15/539,195

(22) PCT Filed: Dec. 28, 2015

(86) PCT No.: PCT/JP2015/086573
§ 371 (c)(1),
(2) Date: Jun. 23, 2017

(87) PCT Pub. No.: WO2016/114103
PCT Pub. Date: Jul. 21, 2016

(65) Prior Publication Data
US 2018/0017727 A1     Jan. 18, 2018

(30) Foreign Application Priority Data

Jan. 13, 2015    (JP) ................................. 2015-004537
Sep. 14, 2015    (JP) ................................. 2015-181059

(51) Int. Cl.
*G02B 27/22*     (2018.01)
*F21V 8/00*      (2006.01)
*G02B 6/122*     (2006.01)

(52) U.S. Cl.
CPC ......... *G02B 6/0016* (2013.01); *G02B 6/0066* (2013.01); *G02B 6/122* (2013.01); *G02B 27/22* (2013.01)

(58) Field of Classification Search
CPC .... G02B 6/0016; G02B 6/0066; G02B 6/122; G02B 27/22; G02B 6/0033; G02B 6/0035;
(Continued)

(56) References Cited

U.S. PATENT DOCUMENTS

| 6,144,480 A | 11/2000 | Li et al. | |
|---|---|---|---|
| 7,830,368 B2 * | 11/2010 | Marttila | G02B 27/2214 345/175 |

(Continued)

FOREIGN PATENT DOCUMENTS

| CN | 101460914 A | 6/2009 |
|---|---|---|
| JP | H10-162177 A | 6/1998 |

(Continued)

OTHER PUBLICATIONS

The International Search Report of PCT/JP2015/086573 dated Mar. 8, 2016.

*Primary Examiner* — Bao Q Truong
(74) *Attorney, Agent, or Firm* — Metrolexis Law Group, PLLC

(57) ABSTRACT

A light-guiding plate of an optical device has first light convergence portions and second light convergence portions. The light convergence portions each have optical surfaces that cause light to be emitted from an emission surface in directions in which the light substantially converges at or scatters from one convergence point or one convergence line, the convergence points or lines for the light convergence portions are different from each other, first and second images are formed by a collection of the convergence points or lines of the first and second light con-
(Continued)

vergence portions, respectively, and in a case where an image is projected to a plane perpendicular to the emission surface and parallel to a light-guiding direction of the light-guiding plate, the first and second light convergence portions cause light to be emitted from the emission surface at a first angle and at a second angle, respectively.

11 Claims, 5 Drawing Sheets

(58) Field of Classification Search
CPC .. G02B 6/0036; G02B 6/0038; G02B 6/0045; G02B 6/0048; G02B 6/0011; F21V 2200/00; F21V 2200/20
See application file for complete search history.

(56) References Cited

U.S. PATENT DOCUMENTS

| | | | |
|---|---|---|---|
| 2007/0279391 A1* | 12/2007 | Marttila | G02B 27/2214 345/169 |
| 2013/0201723 A1* | 8/2013 | Gourlay | G02B 6/0036 362/613 |
| 2013/0321599 A1* | 12/2013 | Harrold | G02B 6/0011 348/55 |
| 2014/0268327 A1 | 9/2014 | Dunn et al. | |

FOREIGN PATENT DOCUMENTS

| | | |
|---|---|---|
| JP | 2000-510603 A | 8/2000 |
| JP | 2008-275922 A | 11/2008 |
| JP | 2009-540440 A | 11/2009 |
| JP | 2012-008464 A | 1/2012 |

* cited by examiner (a)

(b)

OPTICAL DEVICE, OPTICAL SYSTEM, AND TICKET GATE

TECHNICAL FIELD

The present invention relates to an optical device, an optical system, and a ticket gate.

RELATED ART

A stereoscopic display apparatus is known that includes a light-guiding plate, a light source, and a mask or a lens array that is disposed on the front surface of the light-guiding plate and uses a parallax barrier system or a lens array system (see Patent Document 1, for example).

Patent Document 1: JP2012-008464A

SUMMARY OF THE INVENTION

Problem to be Solved by the Invention

When an emission surface of a light-guiding plate has an angular difference between regions, a desired image cannot be formed in some cases.

Means for Solving the Problems

In a first aspect, an optical device includes a light-guiding plate that guides light in a plane parallel to an emission surface that emits light, in which the light-guiding plate has a plurality of first light convergence portions that are provided in a first region, receive light guided by the light-guiding plate, and each have optical surfaces that cause light to be emitted from the emission surface in directions in which the light substantially converges at one convergence point or one convergence line in a space, or substantially scatters from one convergence point or one convergence line in the space, and a plurality of second light convergence portions that are provided in a second region that is different from the first region along a light-guiding direction in which the light-guiding plate guides light, receive light guided by the light-guiding plate, and each have optical surfaces that cause light to be emitted from the emission surface in directions in which the light substantially converges at one convergence point or one convergence line in the space, or substantially scatters from one convergence point or one convergence line in the space. The convergence points or the convergence lines for the plurality of first light convergence portions are different from each other, and a first image is formed in the space by a collection of a plurality of the convergence points or the convergence lines of the plurality of first light convergence portions. The convergence points or the convergence lines for the plurality of second light convergence portions are different from each other, and a second image is formed in the space by a collection of a plurality of the convergence points or the convergence lines of the plurality of second light convergence portions An angle that the light emitted from each of the plurality of first light convergence portions forms with the emission surface is a first angle in a case where an image is projected to a plane that is perpendicular to the emission surface and is parallel to the light-guiding direction in which the light-guiding plate guides light, and an angle that the light emitted from each of the plurality of second light convergence portions forms with the emission surface is a second angle that is different from the first angle, in a case where an image is projected to the plane that is perpendicular to the emission surface and is parallel to the light-guiding direction in which the light-guiding plate guides light.

In a second aspect, an optical device includes a light-guiding plate that guides light in a plane parallel to an emission surface that emits light, in which the light-guiding plate has a plurality of first light convergence portions that are provided in a first region, receive light guided by the light-guiding plate, and each have optical surfaces that cause light to be emitted from the emission surface in directions in which the light substantially converges at one convergence point or one convergence line in a space, or substantially scatters from one convergence point or one convergence line in the space, and a plurality of second light convergence portions that are provided in a second region that is different from the first region along a light-guiding direction in which the light-guiding plate guides light, receive light guided by the light-guiding plate, and each have optical surfaces that cause light to be emitted from the emission surface in directions in which the light substantially converges at one convergence point or one convergence line in the space, or substantially scatters from one convergence point or one convergence line in the space. The convergence points or the convergence lines for the plurality of first light convergence portions are different from each other, and a first image is formed in the space by a collection of a plurality of the convergence points or the convergence lines of the plurality of first light convergence portions, the convergence points or the convergence lines for the plurality of second light convergence portions are different from each other, and a second image is formed in the space by a collection of a plurality of the convergence points or the convergence lines of the plurality of second light convergence portions. A maximum value of angles that a plurality of light rays that constitute light emitted from each of the plurality of first light convergence portions form with the emission surface is a first angle, and a maximum value of angles that a plurality of light rays that constitute light emitted from each of the plurality of second light convergence portions form with the emission surface is a second angle that is different from the first angle.

The second region of the light-guiding plate may be provided forming an angular difference with respect to the first region of the light-guiding plate, the angular difference being a difference between the first angle and the second angle.

In a case where the second region of the light-guiding plate is provided forming an angle with respect to the first region of the light-guiding plate, the angle being a difference between the first angle and the second angle, the second image may be formed at a position at which the second image is continuous with the first image.

The optical surfaces of the plurality of first light convergence portions and the plurality of second light convergence portions may be reflection surfaces that reflect light that is received by the plurality of first light convergence portions and second light convergence portions, and an angular difference between reflection surfaces of the plurality of first light convergence portions and reflection surfaces of the plurality of second light convergence portions may approximately coincide with a difference between the first angle and the second angle.

The optical surfaces of the plurality of first light convergence portions and the plurality of second light convergence portions may be reflection surfaces that reflect light that is received by the plurality of first light convergence portions and second light convergence portions, and an angular difference between reflection surfaces of the plurality of first light convergence portions and reflection surfaces of the plurality of second light convergence portions may approximately coincide with an angular difference between a surface on which the first region is placed and a surface on which the second region is placed.

An area of the optical surfaces of the plurality of first light convergence portions and an area of the optical surfaces of the plurality of second light convergence portions may be determined such that light rays that are emitted from the plurality of first light convergence portions and light rays that are emitted from the plurality of second light convergence portions have approximately the same luminous intensity.

The plurality of light convergence portions may be formed along respective lines that are determined in advance in the plane parallel to the emission surface.

In a second aspect, an optical system includes the above-described optical device and a user interface unit that is located on a second surface that is different from a first surface, in which the first region is placed on the first surface, and the second region is placed on the second surface.

The first image and the second image may form one image that shows a user a position of the user interface unit.

In a third aspect, a ticket gate includes the above-described optical system.

Note that the above-described summary of the invention does not describe all of the features of the present invention. Also, the invention encompasses sub-combinations of these groups of features.

EMBODIMENTS OF THE INVENTION

Although the present invention will be described by way of an embodiment of the invention hereinafter, the following embodiment does not limit the invention according to the claims. Also, all combinations of features described in the embodiment are not necessarily essential for the means for solving the problem of the invention.

Figure 1:
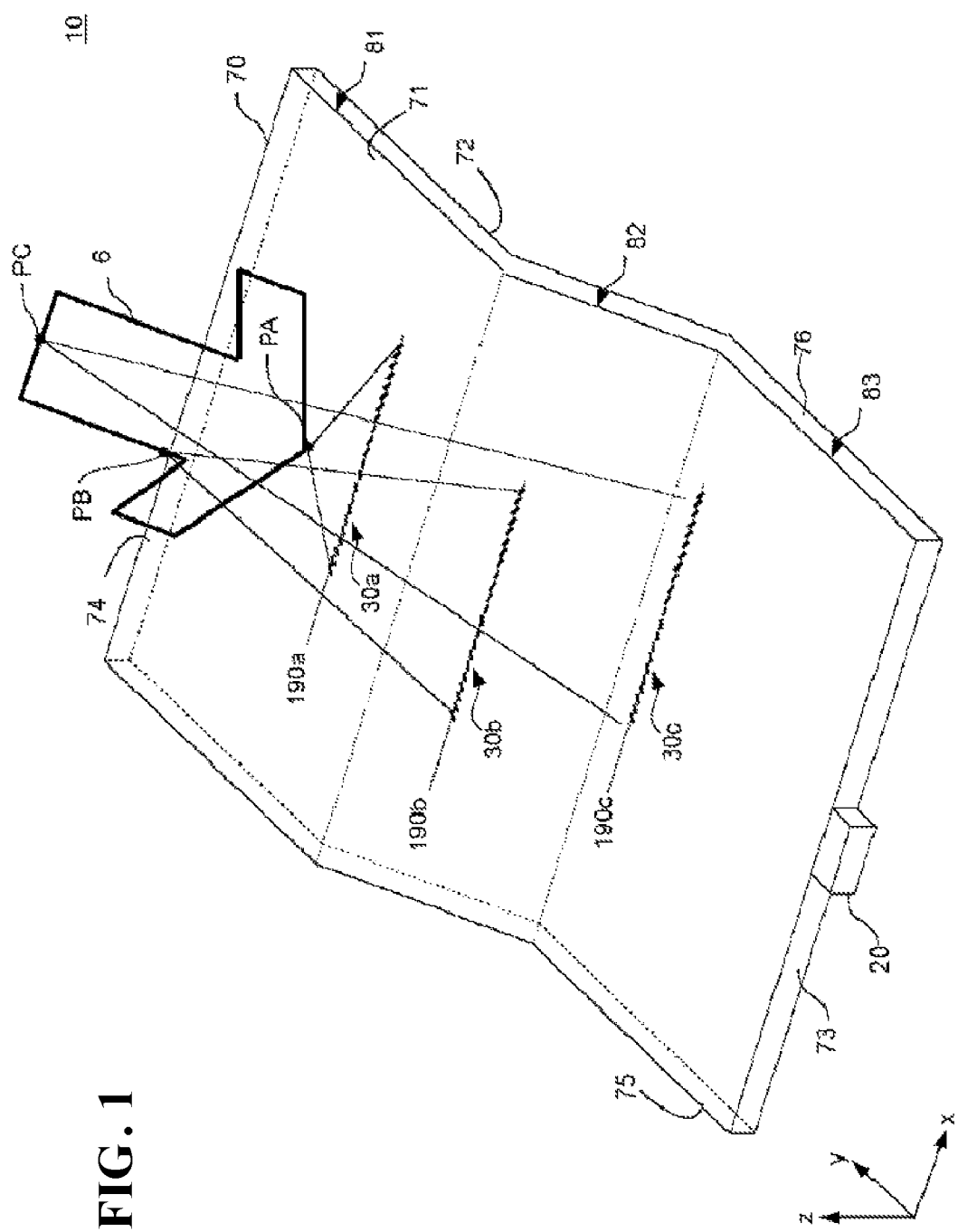
FIG. 1 schematically shows a display apparatus 10 of one embodiment together with a stereoscopic image projected in a space.

FIG. 1 schematically shows a display apparatus 10 in one embodiment together with a stereoscopic image projected in a space. Note that for the purpose of facilitating understanding of the description, the drawings used to describe the embodiment are schematic or illustrative drawings. There are cases where the drawings used to describe the embodiment are not depicted in the actual scale.

The display apparatus 10 has an emission surface 71 that emits light. The display apparatus 10 forms the image 6 as a stereoscopic image using light emitted from the emission surface 71. The image 6 is a stereoscopic image recognized by a user in the space. Note that the stereoscopic image refers to an image recognized to be located at a position that is different from the position of the emission surface 71 of the display apparatus 10. The stereoscopic image includes a two-dimensional image recognized at a position spaced apart from the emission surface 71 of the display apparatus 10, for example. That is, the stereoscopic image includes not only an image recognized as a stereoscopic shape but also an image having a two-dimensional shape recognized at a position that is different from the position on the display surface of the display apparatus 10.

The display apparatus 10 includes a light-guiding plate 70 and a light source 20. The light-guiding plate 70 is made from a transparent resin material having a relatively high refractive index. The material for forming the light-guiding plate 70 may be a polycarbonate resin (PC), a polymethyl methacrylate resin (PMMA), glass, or the like. The material for forming the light-guiding plate 70 may be a flexible material.

The light-guiding plate 70 has a back surface 72 opposite to the emission surface 71. Also, the light-guiding plate 70 has an end surface 73, an end surface 74, an end surface 75, and an end surface 76, which are the four end surfaces of the light-guiding plate 70. The end surface 73 is a light-entering end surface of the light-guiding plate 70. The end surface 73 is provided with the light source 20, and light emitted from the light source 20 enters the light-guiding plate 70 from the end surface 73. The end surface 74 is opposite to the end surface 73. The end surface 76 is a surface opposite to the end surface 75. The light-guiding plate 70 spreads and guides light emitted from the light source 20 in a planar shape in the plane parallel to the emission surface 71.

Note that in the description of the embodiment, a right-handed orthogonal coordinate system having an x axis, a y axis, and a z axis is used in some cases. The z-axis direction is defined as a direction perpendicular to the emission surface 71. The direction from the back surface 72 to the emission surface 71 is defined as the z-axis positive direction. Also, the y-axis direction is defined as a direction perpendicular to the end surface 73. The direction from the end surface 73 to the end surface 74 is defined as the y-axis positive direction. The x axis is a direction perpendicular to the end surface 75 and the end surface 76, and the direction from the end surface 75 to the end surface 76 is defined as the x-axis positive direction. Note that in order to avoid redundancy, the plane parallel to the xy flat plane is called the "xy plane", the plane parallel to the yz flat plane is called the "yz plane", and the plane parallel to the xz flat plane is called the "xz plane" in some cases.

The back surface 72 of the light-guiding plate 70 is provided with a plurality of light convergence portions 30 including a light convergence portion 30a, a light convergence portion 30b, and a light convergence portion 30c. The light convergence portions 30 are each substantially continuous in the x-axis direction. Specifically, the light convergence portion 30a is formed along a line 190a. The light convergence portion 30b is formed along a line 190b. The light convergence portion 30c is formed along a line 190c. Here, the line 190a, the line 190b, and the line 190c are straight lines that are approximately parallel to the x axis. Each light convergence portion 30 is substantially continuous along a straight line that is approximately parallel to the x axis. Light guided by the light-guiding plate 70 enters the positions in the x-axis direction of the light convergence portions 30.

The light convergence portions 30 make light that enters the positions of the light convergence portions 30 substantially converge at fixed points corresponding to the light convergence portions 30. In particular, FIG. 1 shows the light convergence portion 30a, the light convergence portion 30b, and the light convergence portion 30c as some of the light convergence portions 30, and shows a situation in which a plurality of light rays emitted from the light convergence portion 30a, the light convergence portion 30b, and the light convergence portion 30c converge at the light convergence portion 30a, the light convergence portion 30b, and the light convergence portion 30c.

Specifically, the light convergence portion 30a corresponds to a fixed point PA on the image 6. The light rays emitted from positions in the light convergence portion 30a converge at the fixed point PA. Therefore, the wave surface of light emitted from the light convergence portion 30a is a wave surface of light that appears to be emitted from the fixed point PA. The light convergence portion 30b corresponds to a fixed point PB on the image 6. The light rays emitted from positions in the light convergence portion 30b converge at the fixed point PB. In this manner, the light rays emitted from positions in any light convergence portion 30 substantially converge at a fixed point corresponding to that light convergence portion 30. Accordingly, a wave surface of light that appears to be emitted from a corresponding fixed point can be provided by any light convergence portion 30. The fixed points corresponding to the light convergence portions 30 are different from each other, and the image 6 recognized in the space is formed by a collection of fixed points corresponding to the light convergence portions 30. In this manner, the display apparatus 10 projects a stereoscopic image to the space. Note that as one example, the image 6 is depicted by a line, and the line depicting the image 6 is substantially formed by a collection of fixed points corresponding to the light convergence portions 30.

In the present embodiment, the light convergence portions 30 each include multiple reflection surfaces that are substantially continuous in the x-axis direction. The light that is reflected by the reflection surfaces of any light convergence portion 30 converges at a fixed point corresponding to that light convergence portion 30. For example, a plurality of light rays that are reflected by the plurality of reflection surfaces of the light convergence portion 30a converge at the fixed point PA. Also, a plurality of light rays that are reflected by the plurality of reflection surfaces of the light convergence portion 30b converge at the fixed point PB. Also, a plurality of light rays that are reflected by the plurality of reflection surfaces of the light convergence portion 30c converge at the fixed point PC.

In the xy plane, light beams that are guided by the light-guiding plate 70 and pass through respective positions in the light-guiding plate 70 have a spread angle that is smaller than a predetermined value and is centered on the direction that connects the position in the light-guiding plate 70 to the light source. If the light convergence portion 30 is provided at a position spaced apart from the light source, light that is guided by the light-guiding plate 70 and enters the light convergence portion 30 has little spread substantially centered on the y-axis direction. Thus, for example, light emitted from the light convergence portion 30a substantially converges at one fixed point in the plane that includes the fixed point PA and is parallel to the xz plane. Note that in this specification, the spread of a light beam passing through a point located inside or outside of the light-guiding plate refers to the spread of light in the case where this light beam is regarded as light scattering from this point. Also, there are cases where the light beam passing through a point located inside or outside of the light-guiding plate is simply referred to as "spread of light".

Note that when light that enters the light convergence portion 30 has spread in the z-direction, the light emitted from the light convergence portion 30 converges on a line that includes a fixed point in the space and extends along the y axis. However, for the purpose of facilitating understanding of the description of the embodiment, the description will be given focusing on convergence of light in the xz plane, and assuming that light emitted from the light convergence portions 30 converges at fixed points.

In this manner, the light convergence portions 30 are formed along predetermined lines in the plane that are parallel to the emission surface 71. Thus, light guided by the light-guiding plate 70 enters the light convergence portions 30, and the light convergence portions 30 cause the light to be emitted from the emission surface 71 in directions in which the light substantially converges at one convergence point in the space. Note that when the fixed point is located on the back surface 72 of the light-guiding plate 70, the emitted light becomes light scattered from the fixed point. Thus, if the fixed point is located on the back surface 72 of the light-guiding plate 70, the reflection surfaces of the light convergence portions 30 cause light to be emitted from the emission surface 71 in directions in which the light substantially scatters from one convergence point in the space. Note that as will be described later, the light convergence portions 30 may be each formed by a part of a Fresnel lens.

The display apparatus 10 is used in a state in which the emission surface 71 and the back surface 72 have an angular difference. For example, a region 81 of the light-guiding plate 70 has an angular difference that is larger than 0 with respect to a region 82. Also, the region 82 of the light-guiding plate 70 has an angular difference that is larger than 0 with respect to a region 83. The region 81, the region 82, and the region 83 are located at positions that are different from each other in the light-guiding direction in which the light-guiding plate 70 guides light. The region 81 is adjacent to the region 82, and the region 82 is adjacent to the region 83. The light convergence portion 30a is provided in the region 81. The light convergence portion 30b is provided in the region 82. The light convergence portion 30c is provided in the region 83. The emission angles of the light convergence portions 30 are determined such that the display apparatus 10 can form a desired image 6 in the case where the display apparatus 10 is used in a state in which there are angular differences between regions.

Figure 2:
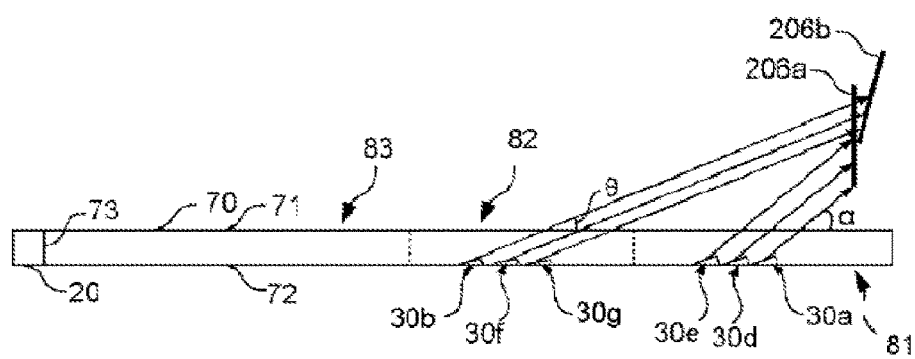
FIG. 2 schematically shows an image formed by the display apparatus 10 in a state in which regions of the display apparatus 10 have no angular difference.
Figure 2:
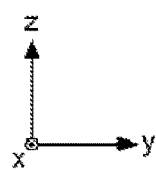

FIG. 2 schematically shows an image formed by the display apparatus 10 in a state in which regions of the display apparatus 10 have no angular difference. FIG. 2 shows some of the light convergence portions 30 in the region 81 and the region 82. Note that only some of the light convergence portions 30 in the region 81 and the region 82 are shown.

The region 81 is provided with a plurality of light convergence portions 30 including the light convergence portion 30a, the light convergence portion 30d, and the light convergence portion 30e. Light emitted from the light convergence portion 30a, light emitted from the light convergence portion 30d, and light emitted from the light convergence portion 30e each have an angle α with respect to the emission surface 71. Note that the angle α is an angle in the case where an image is projected to a plane that is perpendicular to the emission surface 71 and is parallel to the light-guiding direction in which the light-guiding plate 70 guides light. Also, the angle α is the maximum value of angles formed between the emission surface 71 and a plurality of light rays constituting light emitted from each of the light convergence portions 30. The other light convergence portions 30 provided in the region 81 also all similarly emit light that has the angle α with respect to the emission surface 71. The light emitted from the light convergence portions 30 provided in the region 81 forms an image 206*a*. The image 206*a* corresponds to a partial image of the image 6.

The region 82 is provided with a plurality of light convergence portions 30 including the light convergence portion 30*b*, the light convergence portion 30*f*, and the light convergence portion 30*g*. Light emitted from the light convergence portion 30*b*, light emitted from the light convergence portion 30*f*, and light emitted from the light convergence portion 30*g* each have an angle θ with respect to the emission surface 71. Note that the angle θ is an angle in the case where an image is projected to a plane that is perpendicular to the emission surface 71 and is parallel to the light-guiding direction in which the light-guiding plate 70 guides light. Also, the angle θ is the maximum value of angles formed between the emission surface 71 and a plurality of light rays constituting light emitted from the light convergence portions 30. The other light convergence portions 30 provided in the region 82 also all similarly emit light has the angle θ with respect to the emission surface 71. Here, θ is different from α. The light emitted from the light convergence portions 30 provided in the region 82 forms an image 206*b*. The image 206*b* corresponds to a partial image of the image 6.

As shown in FIG. 2, the image 206*a* formed using the light emitted from the light convergence portions 30 provided in the region 81 is not continuous with the image 206*b* formed using the light emitted from the light convergence portions 30 provided in the region 82. In this manner, the emission angles of the light convergence portions 30 are discontinuous between the region 81 and the region 82. That is, angles of the reflection surfaces of the light convergence portions 30 are discontinuous between the region 81 and the region 82. Thus, in a state in which regions of the display apparatus 10 have no angular difference, the light convergence portions 30 provided in the region 81 and the light convergence portions 30 provided in the region 82 do not form a continuous image.

Figure 3:
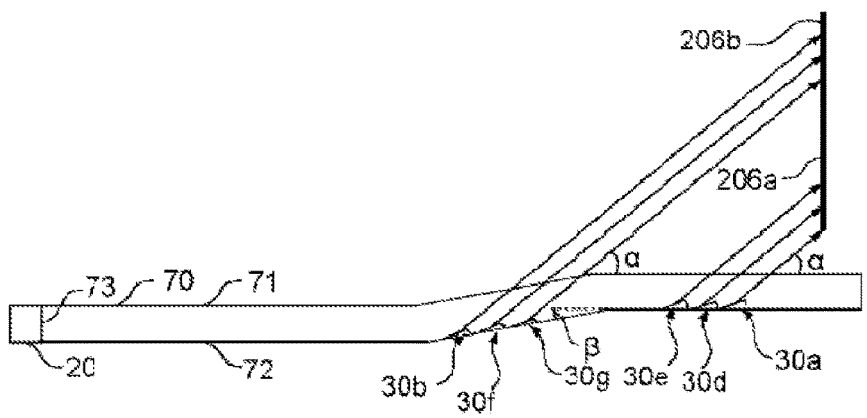
FIG. 3 schematically shows an image formed by the display apparatus 10 in a state in which a region 82 has a predetermined angular difference β with respect to a region 81.
Figure 3:
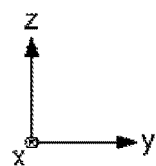

FIG. 3 schematically shows an image formed by the display apparatus 10 in a state in which the region 82 has a predetermined angular difference β with respect to the region 81. As shown in FIG. 2, the image 206*a* formed using the light emitted from the light convergence portions 30 provided in the region 81 is continuous with the image 206*b* formed using the light emitted from the light convergence portions 30 provided in the region 82. In this manner, the emission angle α of the light convergence portions 30 provided in the region 81 and the emission angle θ of the light convergence portions 30 provided in the region 82 are designed such that when the region 82 has the predetermined angular difference β with respect to the region 81, the image 206*a* and the image 206*b* form a continuous image.

Figure 4:
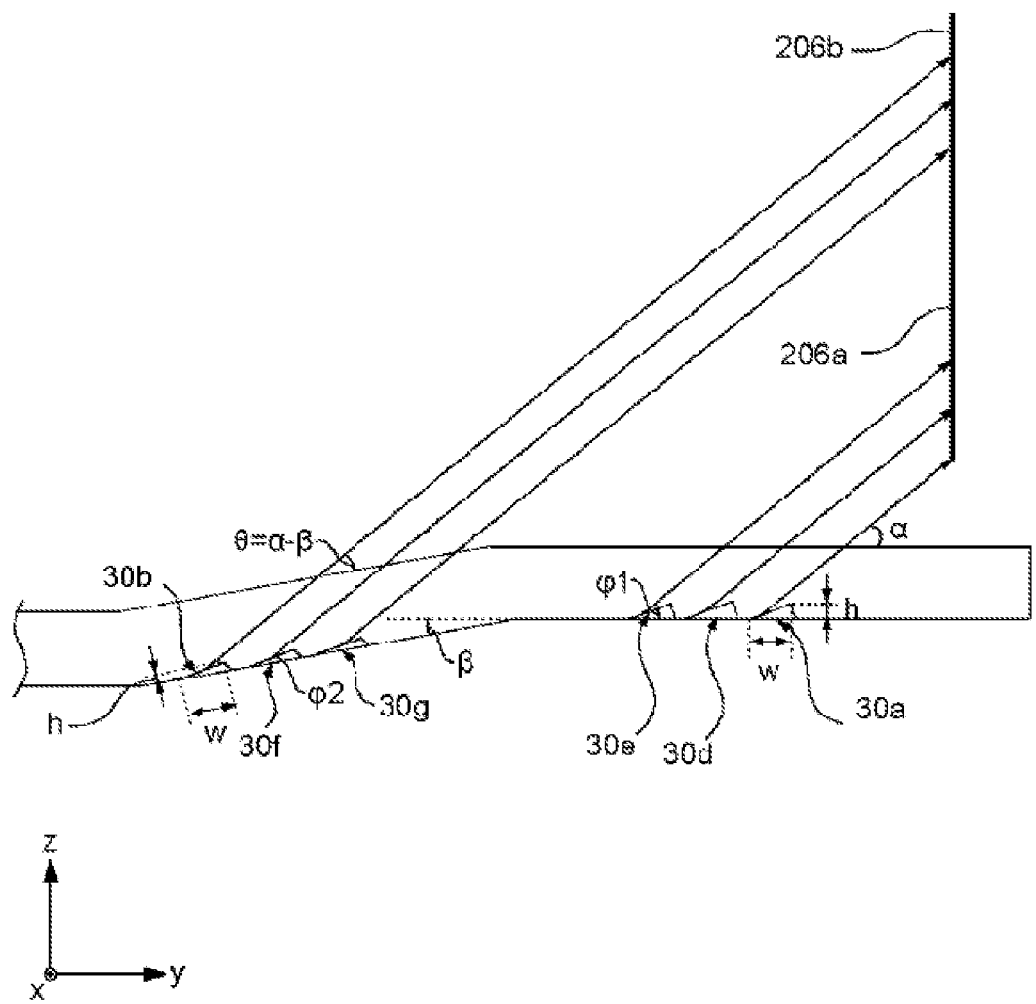
FIG. 4 shows an enlarged view of the region 81 and the region 82 of the display apparatus 10.

FIG. 4 shows an enlarged view of the regions 81 and the region 82 of the display apparatus 10. As shown in FIG. 4, the emission angle θ of the light emitted from the light convergence portions 30 provided in the region 82 is determined so as to coincide with α-β. Specifically, the angles of the reflection surfaces of the light convergence portions 30 provided in the region 82 are determined such that, letting φ1 be the angle that the reflection surfaces of the light convergence portions 30 provided in the region 81 form with the back surface 72, and φ2 be the angle that the reflection surfaces of the light convergence portions 30 provided in the region 82 form with the back surface 72, the difference between φ1 and φ2 coincides with β.

Note that when the image 6 has a constant brightness, it is necessary to avoid discontinuity of the brightness at the border between the image 206*a* and the image 206*b*. Thus, it is desired that the area of the reflection surfaces of the light convergence portions 30 provided in the region 81 and the area of the reflection surfaces of the light convergence portions 30 provided in the region 82 are determined such that light rays emitted from the light convergence portions 30 have approximately the same luminous intensity. For example, a height h and a width w of the reflection surface of each of the light convergence portions 30 may be determined based on angles formed between the back surface 72 and the reflection surfaces of the light convergence portion 30, such that the light rays emitted from the light convergence portions 30 have approximately the same luminous intensity. The light convergence portions 30 provided in the region 81 may have the same height h or width w as each other. Also, the light convergence portions 30 provided in the region 82 may have the same height h or width w as each other. However, it is sufficient that the height h or the width w of the reflection surfaces of the light convergence portions 30 is different between the light convergence portions 30 provided in the region 81 and the light convergence portions 30 provided in the region 82.

Figure 5:
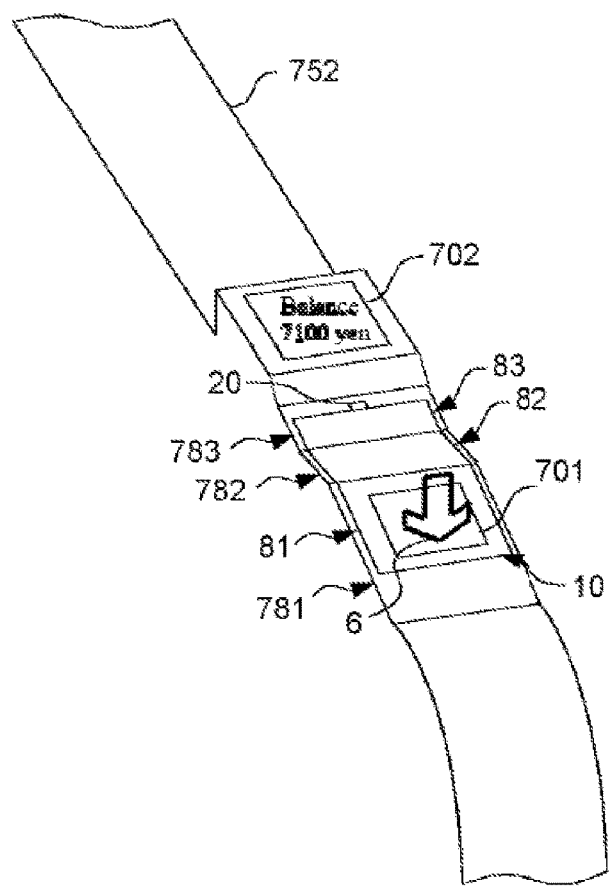
FIG. 5 schematically shows an application example in a case where the display apparatus 10 is utilized in a ticket gate.

FIG. 5 schematically shows an application example in a case where the display apparatus 10 is utilized in a ticket gate. FIG. 5 is a schematic perspective view showing the entirety of a ticket gate system 750. The ticket gate system 750 is an example of an optical system including the display apparatus 10.

The ticket gate system 750 includes a ticket gate main body 752 and the display apparatus 10. The ticket gate main body 752 has a communication unit 701 and a display unit 702. The communication unit 701 and the display unit 702 are examples of a user interface unit, and provide the interface between a user and the ticket gate main body 752.

The communication unit 701 utilizes near-field communication to communicate with a non-contact communication device held by a user. The communication unit 701 communicates with the non-contact communication device through near-field communication. Examples of the non-contact communication device include an IC card such as an IC card ticket and a mobile phone having a non-contact communication function. The display unit 702 displays information to a user. For example, the display unit 702 displays the balance and the like of electronic money stored in the non-contact communication device.

The display apparatus 10 is provided on the communication unit 701. The image 6 formed by the display apparatus 10 presents the position of the communication unit 701 to the user. The user recognizes the image 6 that appears to be located in a space above the communication unit 701. As shown in FIG. 5, according to the display apparatus 10, the image 6 recognized in the space above the communication unit 701 can be formed. Also, the display apparatus 10 is overall transparent, and thus the user can visually recognize a mark on the communication unit 701.

A surface 781 provided with the communication unit 701 has an angular difference β with respect to a surface 782 that is adjacent to the surface 781. Also, the surface 782 has an angular difference −β with respect to the surface 783 that is adjacent to the surface 782. The surface 781 does not have an angular difference with respect to the surface 783. Here, the display apparatus 10 is installed on the ticket gate main body 752 such that the region 81 of the light-guiding plate 70 is placed on the surface 781, the region 82 of the light-guiding plate 70 is placed on the surface 782, and the region 83 of the light-guiding plate 70 is placed on the surface 783. Accordingly, a desired image 6 can be formed above the communication unit 701.

Note that an image that is to show the user the position of the display unit 702 may also be formed in the space located above the display unit 702 by providing a display apparatus having a configuration similar to that of the display apparatus 10, on the display unit 702.

Figure 6:
FIG. 6 schematically shows a light convergence portion 130 and a light convergence portion 132 as modifications of a light convergence portion 30.
Figure 6:
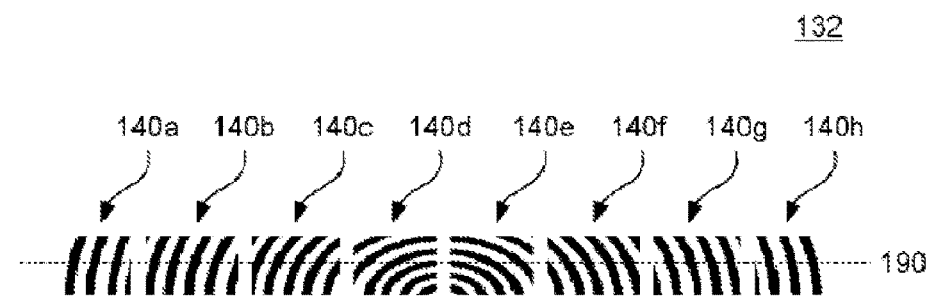

FIG. 6 schematically shows a light convergence portion 130 and a light convergence portion 132 as modifications of the light convergence portion 30. FIG. 6(*a*) schematically shows one light convergence portion 130 formed by a portion of a Fresnel lens. Note that a gap may be provided between a plurality of refracting interfaces (prism planes) of the light convergence portion 130 that functions as the Fresnel lens.

The light convergence portion 132 shown in FIG. 6(*b*) corresponds to a plurality of portions 140*a*, 140*b*, 140*c*, 140*d*, 140*e*, 140*f*, 140*g*, and 140*h* that are obtained by dividing the light convergence portion 130 along the x-axis direction. Light emitted from the portions 140 of the light convergence portion 132 converges at the same fixed point. In this manner, by dividing the light convergence portion into the plurality of portions, a so-called black matrix effect occurs and the contrast of an image increases in some cases. Note that in addition to the reflection surface or the Fresnel lens, a diffraction grating may also be used as the light convergence portion 30.

Although the present invention was described by way of an embodiment, the technical scope of the present invention is not limited to the above-described embodiment. It is clear for a person skilled in the art that various changes or modifications can be added to the above-described embodiment. It is clear from the claims that embodiments to which such changes or modifications are added are also included in the technical scope of the present invention.

Note that the order of executing processes such as operations, procedures, steps, and stages in the apparatus, system, program, and method shown in the claims, specification, and drawings is not clearly stated, such as in particular, "before", "prior to", or the like, and the processes may be realized in any order unless the output of the former process is used in the later process. Even though operation flows in the claims, specification, and drawings are described using "first", "next", or the like for convenience, it does not mean that performing the operation flow in the stated order is essential.

INDEX TO THE REFERENCE NUMERALS

6 Image
10 Display apparatus
20 Light source
30 Light convergence portion
70 Light-guiding plate
71 Emission surface
72 Back surface
73, 74, 75, 76 End surface
130, 132 Light convergence portion
140 Portion
190 Line
701 Communication unit
702 Display unit
750 Ticket gate system
752 Ticket gate main body

The invention claimed is:

1. An optical device comprising:
a light-guiding plate that guides light in a plane parallel to an emission surface that emits light,
wherein the light-guiding plate comprises:
a plurality of first light convergence portions that are provided in a first region, receive light guided by the light-guiding plate, and each have optical surfaces that cause light to be emitted from the emission surface in directions in which the light substantially converges at one convergence point or one convergence line in a space, or substantially scatters from one convergence point or one convergence line in the space; and
a plurality of second light convergence portions that are provided in a second region that is different from the first region along a light-guiding direction in which the light-guiding plate guides light, receive light guided by the light-guiding plate, and each have optical surfaces that cause light to be emitted from the emission surface in directions in which the light substantially converges at one convergence point or one convergence line in the space, or substantially scatters from one convergence point or one convergence line in the space,
the convergence points or the convergence lines for the plurality of first light convergence portions are different from each other, and a first image is formed in the space by a collection of a plurality of the convergence points or the convergence lines of the plurality of first light convergence portions,
the convergence points or the convergence lines for the plurality of second light convergence portions are different from each other, and a second image is formed in the space by a collection of a plurality of the convergence points or the convergence lines of the plurality of second light convergence portions,
an angle that the light emitted from each of the plurality of first light convergence portions forms with the emission surface is a first angle in response to an image being projected to a plane that is perpendicular to the emission surface and is parallel to the light-guiding direction in which the light-guiding plate guides light, and
an angle that the light emitted from each of the plurality of second light convergence portions forms with the emission surface is a second angle that is different from the first angle, in response to an image being projected to the plane that is perpendicular to the emission surface and is parallel to the light-guiding direction in which the light-guiding plate guides light.

2. An optical device comprising:
a light-guiding plate that guides light in a plane parallel to an emission surface that emits light,
wherein the light-guiding plate comprises:
a plurality of first light convergence portions that are provided in a first region, receive light guided by the light-guiding plate, and each have optical surfaces that cause light to be emitted from the emission surface in directions in which the light substantially converges at one convergence point or one convergence line in a space, or substantially scatters from one convergence point or one convergence line in the space; and
a plurality of second light convergence portions that are provided in a second region that is different from the first region along a light-guiding direction in which the light-guiding plate guides light, receive light guided by the light-guiding plate, and each have optical surfaces that cause light to be emitted from the emission surface in directions in which the light substantially converges at one convergence point or one convergence line in the space, or substantially scatters from one convergence point or one convergence line in the space, the convergence points or the convergence lines for the plurality of first light convergence portions are different from each other, and a first image is formed in the space by a collection of a plurality of the convergence points or the convergence lines of the plurality of first light convergence portions, the convergence points or the convergence lines for the plurality of second light convergence portions are different from each other, and a second image is formed in the space by a collection of a plurality of the convergence points or the convergence lines of the plurality of second light convergence portions, a maximum value of angles that a plurality of light rays that constitute light emitted from each of the plurality of first light convergence portions form with the emission surface is a first angle, and a maximum value of angles that a plurality of light rays that constitute light emitted from each of the plurality of second light convergence portions form with the emission surface is a second angle that is different from the first angle.

3. The optical device according to claim 1,
wherein the second region of the light-guiding plate is provided so as to form an angular difference with respect to the first region of the light-guiding plate, the angular difference being a difference between the first angle and the second angle.

4. The optical device according to claim 1,
wherein in a case where the second region of the light-guiding plate is provided so as to form an angle with respect to the first region of the light-guiding plate, the angle being a difference between the first angle and the second angle, the second image is formed at a position at which the second image is continuous with the first image.

5. The optical device according to claim 1,
wherein the optical surfaces of the plurality of first light convergence portions and the plurality of second light convergence portions are reflection surfaces that reflect light that is received by the plurality of first light convergence portions and second light convergence portions, and an angular difference between reflection surfaces of the plurality of first light convergence portions and reflection surfaces of the plurality of second light convergence portions approximately coincides with a difference between the first angle and the second angle.

6. The optical device according to claim 1,
wherein the optical surfaces of the plurality of first light convergence portions and the plurality of second light convergence portions are reflection surfaces that reflect light that is received by the plurality of first light convergence portions and second light convergence portions, and an angular difference between reflection surfaces of the plurality of first light convergence portions and reflection surfaces of the plurality of second light convergence portions approximately coincides with an angular difference between a surface on which the first region is placed and a surface on which the second region is placed.

7. The optical device according to claim 1,
wherein an area of the optical surfaces of the plurality of first light convergence portions and an area of the optical surfaces of the plurality of second light convergence portions are determined such that light rays that are emitted from the plurality of first light convergence portions and light rays that are emitted from the plurality of second light convergence portions have approximately the same luminous intensity.

8. The optical device according to claim 1,
wherein the plurality of first light convergence portions and the plurality of second light convergence portions are formed along respective lines that are determined in advance in the plane parallel to the emission surface.

9. An optical system comprising:
the optical device according to claim 1; and
a user interface unit that is located on a second surface that is different from a first surface,
wherein the first region is placed on the first surface, and the second region is placed on the second surface.

10. The optical system according to claim 9,
wherein the first image and the second image form one image that shows a user a position of the user interface unit.

11. A ticket gate comprising:
the optical system according to claim 9.

* * * * *